United States Patent [19]

Castenmiller et al.

[11] Patent Number: 4,874,626
[45] Date of Patent: Oct. 17, 1989

[54] EDIBLE PLASTIC PRODUCT

[75] Inventors: Wilhelmus A. M. Castenmiller, Vlaardingen; Allan K. Chesters; Peter B. Ernsting, both of Delft, all of Netherlands

[73] Assignee: Lever Brothers Company, New York, N.Y.

[21] Appl. No.: 168,828

[22] Filed: Mar. 16, 1988

[30] Foreign Application Priority Data

Mar. 20, 1987 [GB] United Kingdom ................. 8706711

[51] Int. Cl.$^4$ .............................................. A23D 3/00
[52] U.S. Cl. ................................... 426/564; 426/604; 426/662
[58] Field of Search ............... 426/312, 564, 474, 603, 426/601, 604, 804, 662

[56] References Cited

U.S. PATENT DOCUMENTS 2,937,093  5/1960  Gorman et al. ..................... 426/564
2,970,917  2/1961  Melnick .............................. 426/564

FOREIGN PATENT DOCUMENTS 1922039  4/1969  Fed. Rep. of Germany .
8101640  6/1981  PCT Int'l Appl. .
1333938  10/1973  United Kingdom .

Primary Examiner—Donald E. Czaja
Assistant Examiner—Celine T. Callahan
Attorney, Agent, or Firm—Matthew J. McDonald

[57] ABSTRACT

An edible plastified product comprising a continuous fat phase and a dispersed gas phase which includes helium. The products according to the invention exhibit an improved spattering behavior when used for frying.

A process for preparing an edible plastified product involves incorporating gas that includes helium in the composition that is to constitute the product and subjecting the gas-containing composition to plastifying conditions at super-atmospheric pressure. It is an advantage of this process that, with the use of gas containing helium, relatively small gas bubbles can be obtained relatively easily.

8 Claims, No Drawings

EDIBLE PLASTIC PRODUCT

FIELD OF THE INVENTION

The present invention relates to an edible, plastified product comprising a continuous fat phase and a dispersed gas phase and to a process for the preparation thereof.

BACKGROUND OF THE INVENTION

Edible plastified products comprising a continuous fat phase and a dispersed gas phase are well known. Incorporation of e.g. air in margarine or shortening may have a beneficial effect on the properties of such products.

A. J. C. Andersen and P. N. Williams describe in Margarine, 2nd revised edition, Pergamon Press (1965), pp. 313-314, packets of margarine having a large volume in relation to their weight because of the even distribution of 15-40% finely divided gas throughout the margarine. The gas is air or inert gas such as nitrogen. Such gas-containing margarine is said to spread more easily at low temperatures, to give easier mixing in domestic cake-making, to spatter less when used in frying, to have better shortening properties and greater resistance to mould growth. For the manufacture of such margarine, reference is made to U.S. Pat. Nos. 2,937,093 and 2,970,917.

U.S. Pat. No. 2,937,093 describes the manufacturing of whipped fatty product emulsions such as margarine containing more than 20 vol. % of gas. The process comprises whipping a fatty composition to incorporate gas therein, chilling the whipped emulsion with violent agitation, holding it to permit setting of the product emulsion while transporting it, substantially terminating working of the product emulsion upon setting and cutting the set product emulsion. The preferred gas used in the process is nitrogen. The specification aims at providing a process to prepare products such as whipped margarine which are divided into unit portions and packaged via solid filling, using traditional packaging equipment instead of having to introduce the whipped product into open cups or containers in a flowable condition, the so-called liquid filling.

According to U.S. Pat. No. 2,970,917 the "mouthing" qualities, rate of flavour release, stability, resistance to mould growth, spreadability in the cold, break coverage, resistance to "oiling off" at room temperature, frying properties and baking performance of margarine can be improved by incorporating therein, in a specified way, about 15-40 vol. % of finely and uniformly dispersed inert gas, e.g. air, carbon dioxide, nitrogen etc. The product is prepared by incorporating the gas in a liquid margarine emulsion. The composition is then plastified by cooling and agitating it at super-atmospheric pressure, e.g. in a Votator, to produce a flowable mass and then the pressure on the flowable mass is released to atmospheric level, prior to packaging. The flowable mass can be filled into a moulding zone after the pressure has been released to allow expansion of the gas. It is said that, should the flowable mass be confined within the mould under positive pressure during the time of setting up, subsequent gas expansion varies from surface to the centre of the moulded product, with the result that fracturing of the product occurs and variation in porosity and colour are noted.

As an alternative to the above described liquid filling, the specification describes how the product can be packaged via solid filling. In that case, the still workable mass is passed through an orifice having the desired cross-section of a print at low temperature, chilling the extruded solid product to obtain case hardening, cutting the extruded product to proper length, wrapping and cartoning it.

In practice, the above described processes often do not give satisfactory results. It can, for example, be undesirable to employ liquid filling. With liquid filling the network of fat crystals, which largely determines the ultimate structural properties of the product, is formed to a considerable extent after the packaging, during storage. In particular for relatively hard products this may be unsuitable. It may, for example, cause such products to be brittle. In such cases, to impart the desired structural properties to the product, it is often necessary to cause the network of crystals to form to a large extent during the process prior to packaging and to employ solid filling to divide the product into unit portions.

With solid filling, similar problems occur as described above for liquid filling if the flowable mass is confined within the mould under super-atmospheric pressure while it is setting. In the solid filled product, the gas distribution often is inhomogeneous, the amount of dispersed gas and the average bubble size being larger near the surface than in the centre of the product, causing, inter alia, colour variation to occur. In some cases, a foam layer may form on the surface.

Whether applying solid or liquid filling, in practice often problems arise to control the amount of dispersed gas in the end product. The beneficial effects of the gas are generally ascribed to the dispersed gas and dissolved gas supposedly does not contribute. The amount of dispersed gas in the end product is often subject to substantial variations even though the amount of gas included in the composition during the preparation is kept constant. This not only affects the quality of the product per se, but also leads to variation in the weight-/volume ratio of the product which is undesirable, whether the division of the product in unit portions is done on a weight basis or on a volume basis.

SUMMARY OF THE INVENTION

It has now been found that these problems can be substantially overcome by employing gas that contains helium.

Accordingly, the present invention provides in one aspect an edible, plastified product comprising a continuous fat phase and a dispersed gas phase, wherein the gas contained in the product includes helium.

In another aspect, the present invention provides a process for the preparation of an edible, plastified product according to the present invention, which process comprises incorporating gas that includes helium in the composition that is to constitute the product and subjecting the gas-containing composition to plastifying conditions at super-atmospheric pressure.

Incorporation of helium in an edible product having a continuous fat phase as such is known: GB No. 1,333,938 is concerned with pourable emulsions stabilized against phase separation by incorporation of an effective amount of gas bubbles. Gas that is inert towards the various ingredients can be employed, such as for instance air and carbon dioxide. The use of nitrogen is preferred. In one of the Examples given to illustrate the stabilization of pourable emulsions with gas bubbles, the use of helium gas is disclosed.

GB No. 1,333,938 does not relate, however, to the incorporation of gas in plastified instead of pourable products.

The use of inert, non-toxic gas in the preparation of an edible plastified product has been disclosed in WO No. 8101640. This specification is concerned with the preparation of butter, directly from milk with a normal fat content, without the intermediate preparation of cream. The butter is prepared by subjecting milk to a mechanical action with a shear effect, which sets it into a swirling flow. The separated flocks of butterfat are separated by passing the milk flow through a filter screen. The swirling motion can be exerted by a pressurized gas and/or by a centrifugal pump. Besides compressed air, as example of suitable gases, the specification mentions carbon dioxide, oxygen, nitrogen, helium, argon or mixtures thereof, at a pressure of 0.6 to 1 bar. The specification does not aim at including gas in the butter; it is solely concerned with providing a way to make butter from natural milk, without the intermediate step of preparing cream.

DESCRIPTION OF THE PREFERRED EMBODIMENTS

The present invention is particularly advantageous for the incorporation of relatively small quantities of gas: preferably the product comprises 0.5-30 vol. % of dispersed gas phase, more preferably it comprises 2-20 vol. % of dispersed gas phase, 3-15 vol. % of dispersed gas phase being especially preferred.

The presence of such an amount of dispersed gas not only can improve e.g. the appearance and spreadability of the product, it can in particular be beneficial for the spattering behaviour if the product is used for frying. This is especially the case if the product comprises a dispersed aqueous phase. The spattering caused by the explosive evaporation of water droplets during the heating up of the product to frying temperatures can be substantially reduced by the presence of a relatively small amount of dispersed gas. For example, the present product may suitably comprise 0.5-65 wt. % dispersed aqueous phase. The amount of dispersed aqueous phase present in the product is preferably 5-45%, more preferably 10-25%, calculated on the weight of the product. Particularly preferred embodiments of the present invention are products consisting essentially of a continuous fat phase, a dispersed aqueous phase and a dispersed gas phase, for example gas-containing margarine.

The amount of dispersed gas phase that is present in the product can be readily estimated by determining the specific volume of the product and comparing it with the specific volume of a product prepared without gas incorporation but in an otherwise similar way.

Optimal effects, in particular also regarding the influence on the spattering behaviour, can be obtained if the gas is dispersed in the product in the form of rather small bubbles. Preferably, the volume weighted mean diameter of the gas bubbles is 1-100$\mu$, more preferably it is 5-70$\mu$, a volume weighted mean diameter of the gas bubbles of 10-50$\mu$ being especially preferred.

It is an advantage of the present invention that with the use of gas containing helium a dispersion with relatively small gas bubbles can be obtained relatively easily.

The gas bubble size can be estimated micrographically, as described e.g. in DE No. 1,922,039.

Conventionally, in particular problems arose when it was tried to prepare products containing relatively small amounts of dispersed gas phase. Particularly if, for structural reasons, the product had to be prepared using solid filling, it was virtually impossible to produce such products on a factory scale with an adequate control of the amount of dispersed gas present in the ultimate product, after storage of e.g. one week, and with the gas homogeneously distributed throughout the product. It is a major advantage of the present invention that it provides such products with small amounts of gas properly distributed, as well as a process for their preparation, which can be carried out on a factory scale relatively easily, allowing a constant product quality to be obtained. Once the level of gas incorporation in the composition that is required to obtain the desired quantity of dispersed gas phase has been determined, a product containing this predetermined amount of dispersed gas phase can be produced in large quantities, essentially by keeping the amount of gas introduced into the composition that is to constitute the product, constant.

It has surprisingly been found that, to achieve these beneficial effects, it is not necessary to employ pure helium as such as gas phase. Substantially improved results can already be obtained by merely including in the gas to be incorporated a relatively small amount of helium. Accordingly, it is preferred to employ in the present process gas that comprises 10-100 vol. %, more preferably 20-100 vol. % of helium. Correspondingly, it is preferred that 10-100 vol. %, more preferably 20-100 vol. % of the gas contained in the product is helium. The balance of the gas can suitably be air or, preferably, nitrogen. Other gasses can, however, be used as well.

The preferred embodiments of the present invention, in which in particular advantages can be achieved compared with the prior art, are relatively hard products. Suitably, the present product has a hardness, indicated by the C-value at 15° C., the $C_{15}$-value, of 50-1500 g/cm$^2$. The $C_{15}$-value is preferably 100-1000 g/cm$^2$, more preferably 300-800 g/cm$^2$.

The hardness, as indicated by C-values, can be determined using a cone penetrometer as described in J.A.O.C.S. 36 (1959), 345-348.

Helium essentially does not occur in the atmosphere. Because of that, upon prolonged storage, ultimately substantially all helium will diffuse out of the product. The helium can be replaced by air that diffuses into the product and/or by condensed matter, e.g. liquid or solid fat or aqueous phase material. In relatively hard products the predominant mechanism is the replacement of helium by air, and because, we believe, the beneficial effects of the gas are determined more by the number and size of the dispersed bubbles than by the chemical nature of the gas contained therein, the gradual exchange of helium with air does not substantially adversely affect the product properties. Thus, despite the gradual disappearance of helium from the product upon prolonged storage, for fairly hard products beneficial product properties are retained. However, for soft products, apart from helium-air exchange, replacement of helium by condensed matter may also occur. Because of this, the amount of gas phase may slowly become less and the products may gradually lose their beneficial properties upon prolonged storage. To counteract this process, in particular for soft products it may be beneficial to use as gas to be included in the product a mixture of helium with e.g. air or nitrogen rather than pure helium. For example, a mixture of e.g. 20-50 vol. % of helium and 80-50 vol. % of nitrogen can suitably be used.

The choice of ingredients to be included in the fat phase or the aqueous phase compositions is not critical.

For example, emulsifier, colouring matter or flavouring substance may be included. Protein and/or gelling and/or thickening agent such as, for example, gelatin, guar gum or caseinate may be present in the aqueous phase. As fat can be employed glyceride oils and fats such as, for example, soybean oil, sunflower oil, fish oil, lard and chemically and/or physically modified varieties thereof and substances which are physically similar to glyceride oils but which are essentially indigestible such as, for example, waxes and poly fatty acid esters of lower saccharides, e.g. sucrose octa stearate, and mixtures thereof. (Throughout this specification the terms oil and fat are used interchangeably).

Preferably, however, the fat consists essentially of glycerides. It is particularly preferred to use fats having relatively high melting points, e.g. containing a substantial amount of partially hydrogenated oil, e.g. soybean oil or fish oil, which allow products with a hardness as indicated above to be obtained easily.

The incorporation of a relatively small amount of gas present in the form of fairly small, homogeneously dispersed gas bubbles can improve the appearance of the edible plastified product, making it less glossy. It can thereby make the appearance of products such as margarine and shortening, which are usually prepared using votator type equipment (closed systems operated with high line pressure, mostly without incorporating gas in the product that is being manufactured), more similar to that of churned butter. Thus, the present invention is in particular advantageous for such products wherein the fat contained therein includes fat other than butterfat. Preferably the fat contained in the product consists of 0-95 wt. % butterfat and 100-5 wt. % other fat. More preferably, the butterfat content of the fat contained in the present product is less than 60 wt. %, even more preferably less than 40 wt. %. Most preferably, the present product contains no butterfat.

The plastified product is preferably prepared using votator-type equipment. In a Votator, a warm, essentially liquid composition is subjected to plastifying conditions (plastification: the creation of a three-dimensional structure causing the end product to be essentially solid, retaining its shape at ambient temperature, rather than liquid such as a pourable margarine) by passage through one or more scraped surface heat-exchangers, optionally combined with one or more stirred crystallizers and/or resting tubes. The liquid composition is chilled and worked to cause crystallization of fat. Possibly break up of bubbles or droplets of dispersed phase occurs too, thus causing the discontinuous phase or phases to be dispersed more finely. If the composition comprises an aqueous phase composition containing gelling agent, then the chilling may induce gelation of the aqueous phase as well. Usually the production line from the first chilling and/or working unit down to the packaging stage constitutes a closed system. The composition is fed through the line using one or more pumps. Especially when the line includes a resting tube optionally containing sieve plates, and the product is divided into unit portions via the solid filling system, the pressure at the entrance of the line can be high. A typical pressure at the entrance of a factory scale line is, for example, 40 bar.

During passage through the production line, crystallization of fat does not occur instantaneously, but a supercooled system is formed. Part of the crystallization occurs while the composition is present in the process line and part of it occurs after it has been divided into unit portions and packed. Thus, the three dimensional structure of the product is only partly formed while the composition is subjected to cooling and working in the production line and the structure is further built up during the subsequent transportation and storage. If solid filling is employed, the product leaving the plastifying equipment is already plastic, i.e. sufficiently solid to retain its shape. With liquid filling, the product leaving the process line is still pourable and becomes plastic in the pack. If one wishes to employ solid filling for a product, then the production line commonly comprises a resting tube to provide an opportunity for the formation of the three dimensional structure in the product to allow it to become plastic. Alternatively, if the product is to be liquid filled, then often, to obtain an appropriate structure in the end product, on the one hand crystallization should be allowed to occur to obtain crystals of a suitable size, but on the other hand the three dimensional network owing to the formation of so-called bridges between crystals, should not yet be formed. Under these circumstances it is often adequate to pass the chilled and worked composition through a stirred crystallizer before dividing it into unit portions. However, as last unit before the liquid filling packaging stage, a scraped surface heat-exchanger can be desirable for some products.

Compared with the prior art, the use of gas containing helium is particularly beneficial in processes employing solid filling, wherein a production line containing a resting tube is used, in which high line pressures occur.

Accordingly, in the present process the subjection to plastifying conditions preferably includes passing the composition through a resting tube. After the composition has been subjected to plastifying conditions, the composition is divided into unit portions, preferably via solid filling. Plastification of the product is preferably brought about by passage through Votator-type equipment. The subjection to plastifying conditions is preferably carried out in a closed line. The pressure at the entrance of the closed line preferably is 10-100 bar, more preferably 20-60 bar. The gas is preferably incorporated in the composition near the beginning of the line, while the composition still comprises essentially no crystallized fat. Introduction of the gas at this stage allows a fine, homogeneous dispersion of gas bubbles to be obtained relatively easily.

The product may comprise emulsifier. Commonly used emulsifiers in products of this kind are, for example, partial glycerides, e.g. monoglycerides derived from partially hydrogenated oil, and phosphatides, e.g. provided by soybean lecithin or fractions thereof.

It is well known that the presence of emulsifiers has an influence on the spattering behaviour of the product if used for frying. Well-known emulsifier compositions which impart favourable frying properties to the product are fractions of vegetable lecithin with an increased phosphatidyl choline (PC) content, e.g. the alcohol-soluble fraction of vegetable lecithin, and partially hydrolyzed vegetable lecithin, e.g. containing 25-45% lysophosphatides calculated on the weight of the phosphatides.

It has surprisingly been found that in the present product a more beneficial effect on the spattering properties can be obtained by including native vegetable lecithin than with PC-enriched fractions or hydrolyzed modifications thereof.

The present product, therefore, preferably comprises native vegetable lecithin. By native vegetable lecithin is meant a lecithin composition containing a mixture of phosphatides as it is obtained from the degumming of crude oil, without substantive modification of the phosphatide composition contained in the lecithin by means of fractionation, chemical modification or otherwise. The lecithin as obtained from the degumming of crude oil, for example water-degumming of soybean oil, can be used as such or after purification thereof. The purification may, for example, comprise removal of carbohydrates and/or triglycerides, e.g. by extraction with acetone. Any such purification treatment should, however, be carried out in such a manner that it does not cause a substantial change in the composition of the phosphatides contained in the lecithin.

Preferably, the native vegetable lecithin is lecithin obtained from rapeseed, sunflower seed or soybeans, or a mixture thereof. Soybean lecithin is particularly preferred. Preferably, the native vegetable lecithin is included in the product in such an amount that it provides 0.01–4% phosphatides, more preferably 0.05–2% phosphatides calculated on the weight of the product.

The present product may comprise a substantial amount
of sodium chloride, e.g. 1–2% by weight or more. Preferably, however, the product comprises less than 1 wt. % of sodium chloride. More preferably it comprises 0–0.5 wt. % of sodium chloride. Especially with products with a relatively low salt content, beneficial effect on the spattering behaviour can be achieved by the incorporation of a relatively small amount of finely dispersed gas containing helium in combination with native vegetable lecithin.

EXAMPLE 1

Margarine was prepared on laboratory scale using the following composition:

|  | wt. % |
|---|---|
| Fat phase | |
| Fish oil hydrogenated to a melting point of 35° C. | 50 |
| Soybean oil | 31 |
| Admul 6203 ® (monoglyceride emulsifier) | 0.05 |
| Native soybean lecithin | 0.4 |
| Aqueous phase | |
| Whey solids | 1.0 |
| NaCl | 0.6 |
| Citric acid to pH =4.5 | |
| Water | 17 |

The composition was plastified by passage through a scraped-surface heat exchanger (A-unit), a stirred crystallizer (C-unit), another A-unit and a resting tube (B-unit). Helium was introduced into the composition before entrance into the first A-unit. The product was stored at 5° C. The dispersed gas content of the product was measured over a period of several weeks.

The results were as follows:

| storage time | dispersed gas content (ml/100 g) |
|---|---|
| 1 day | 14.1 |
| 4 days | 13.2 |
| 1 week | 12.1 |
| 2 weeks | 11.6 |
| 5 weeks | 11.5 |
| 8 weeks | 9.0 |

The gas bubbles in the product were distributed throughout the product essentially homogeneously. They had a size mainly in the range of 20–60μ. The gas bubble size remained essentially constant throughout the entire test period.

The frying properties (spattering, foam, sediment, sticking) of the product were evaluated by an expert after 1 week, 4 weeks and 7 weeks. They were very satisfactory. Especially, the spattering behaviour was very good and remained so throughout the test period (about score 9 on a scale of 0–10, 10 indicating no spattering at all when the product is heated).

EXAMPLE 2

Example 1 was repeated using a 1:1 volume mixture of helium and air. The results were very similar to those of Example 1. The amount of dispersed gas still present after 8 weeks storage, as percentage of the dispersed gas content after 1 day, appeared to be even slightly higher than in Example 1. The gas bubble size was again as small as in Example 1 and it remained essentially the same during the test period. The frying properties, particularly the spattering characteristics, were excellent, and remained so even after 7 weeks storage.

EXAMPLE 3

Example 1 was repeated on pilot plant scale; an acceptable gas dispersion of the product was obtained. For comparison, the experiment was repeated twice using, instead of the helium, either nitrogen or air. In both cases, the resulting products were unacceptable. The gas was not sufficiently homogeneously dispersed. When a pack was cut in half, the appearance of the surface at the centre of the cross-section was substantially different from that near the surface.

EXAMPLE 4

Example 1 was repeated a number of times on pilot plant scale but using a production line having an A-C-A-A-B sequence, using as gas either helium or a mixture of helium and nitrogen, comprising 80 vol. % nitrogen and only 20 vol. % helium, and varying the amount of gas that was introduced. The dispersed gas content of the product emerging from the B-unit, and after storage for periods ranging from 1 day to 7 weeks, was determined. The spattering behaviour was evaluated after 4 weeks and after 7 weeks.

The results are shown in the table. When the experiment was repeated using 100% nitrogen as gas, the appearance and gas distribution of the resulting product were unacceptable.

TABLE

| Gas | He | 80:20 (v/v) N$_2$/He |
|---|---|---|
| Dispersed gas content (ml/100 g) | | |
| Storage period | | |

TABLE-continued

| Gas | | He | | 80:20 (v/v) N$_2$/He | |
|---|---|---|---|---|---|
| (after B-unit) | 5.0 | 9.9 | 9.8 | 6.1 | 5.7 |
| 1 day | 6.2 | 14.3 | 12.7 | 12.6 | 12.5 |
| 1 week | 6.4 | 13.9 | 12.7 | — | — |
| 3 weeks | 6.1 | 12.5 | 11.7 | 11.8 | 12.2 |
| 5 weeks | 6.3 | 12.6 | 11.4 | 10.3 | 13.0 |
| 7 weeks | 5.0 | 12.0 | 11.3 | 11.1 | 10.6 |
| Spattering value* | | | | | |
| Storage period | | | | | |
| 4 weeks | 10 | 9/10 | 10 | 10 | 10 |
| 7 weeks | 9/10 | 9/10 | 9 | 8 | 9/10 |

*Scale 0–10: 10 indicates essentially no spattering upon heating of the product; 0 indicates very bad spattering.

EXAMPLE 5

Margarines were prepared on factory scale using the following composition:

| | wt. % |
|---|---|
| Fat phase | |
| Soybean oil | 41 |
| Sunflower oil | 4 |
| Palmkernel oil | 3 |
| Hardened soybean oil | 13 |
| Hardened palm oil | 21 |
| Admul 6203 ® | 0.2 |
| Alcohol soluble fraction of native soybean lecithin | 0.4 |
| Beta-carotene, flavours and vitamins | |
| Aqueous phase | |
| Whey (26% solids) | 2.4 |
| Milk (9% solids) | 2.4 |
| Water | 13 |
| pH adjusted to 4.0 by addition of citric acid | |

The compositions were plastified by subsequently passing said compositions through a scraped-surface heat exchanger (A-unit), a stirred crystallizer (C-unit), two additional A-units, and a resting tube (B-unit). Pure helium was introduced into the compositions between the second and third A-unit in accord with the first table on page 19.

Three different margarine products were prepared using the composition and process described above. The physical properties of the products obtained are represented below:

| | Product A | Product B | Product C |
|---|---|---|---|
| Helium content | 0 wt. % | 5.1 wt. % | 6.3 wt. % |
| Gas dispersion | //// | coarse | fine* |
| C$_5$ | 1330 | 1030 | 685 |
| C$_{10}$ | 965 | 695 | 450 |
| C$_{15}$ | 860 | 585 | 375 |
| C$_{20}$ | 395 | 365 | 310 |

*most droplets in the range of 10–30 μm

The solids content of the three margarine products at various temperatures did not differ very much. The N-values at different temperatures for the three compositions did not significantly differ from the values represented below:

N$_5$ - 40
N$_{10}$ - 34
N$_{20}$ - 20
N$_{30}$ - 7
N$_{35}$ - 2

The spattering behaviour of the above three margarines was evaluated after storage of the products for 1, 3, 6, 9 and 12 weeks at 5° C., using the following procedure:

25 g margarine was heated in a glass pan on an electric plate that was heated to about 200° C. The fat that spattered out of the pan by the force of expanding evaporating water was caught on a sheet of paper situated above the pan. The image obtained on the paper was compared with a standard set of 11 pictures, numbered 0–11; the number of the best resembling picture was recorded as the spattering value. 10 indicates no spattering and 0 indicates very bad spattering. If there was no clear preference for one picture, a spattering value equal to the average of the two best resembling pictures was chosen.

The spattering values obtained for the three different margarines, after varying periods of storage are represented below:

| Storage time | Spattering Values for | | |
|---|---|---|---|
| | Product A | Product B | Product C |
| 1 week | 7 | 8 | 8.5 |
| 3 weeks | 8 | 8 | 9.5 |
| 6 weeks | 6 | 8.5 | 9 |
| 9 weeks | 8 | 8.5 | 9 |
| 12 weeks | 8 | 8.5 | 8.5 |

During the spattering tests it was observed that products B and C, comprising helium, produced less spattering sound than product A, comprising no helium.

We claim:

1. Edible plastified product comprising a continuous fat phase, 0.5–30 volume % of a dispersed gas phase present as gas bubbles with means diameter of 1 to 100 microns, and 0.5 to 65% of a dispersed aqueous phase, where the dispersed gas phase comprises 10 to 100 vol. % helium.

2. Product according to claim 1, wherein the fat phase is substantially free of butterfat.

3. Product according to claim 1, wherein the volume weighted mean diameter of the gas bubbles is 5–70μ.

4. Product according to claim 1, wherein the dispersed aqueous phase is 5–45 wt. % of the product.

5. Product according to claim 4, consisting essentially of a continuous fat phase, a dispersed aqueous phase and a dispersed gas phase.

6. Product according to claim 1, wherein the product has hardness C$_{15}$-value of 100–1000 g/cm$^2$.

7. Product according to claim 1, wherein the continuous fat phase further comprises 0.05–2 wt % of phosphatides.

8. Product according to claim 1, wherein the fat contained in the product consists of 40–100 wt. % of a fat other than butterfat and balance butterfat.

* * * * *